(12) United States Patent
Kageyama et al.

(10) Patent No.: US 6,469,973 B1
(45) Date of Patent: Oct. 22, 2002

(54) OPTICAL STORAGE DEVICE INCLUDING A STABLE CARTRIDGE HOLDING MECHANISM

(75) Inventors: Kazuhiko Kageyama; Hideo Nasu; Hideki Yamaguchi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/425,555

(22) Filed: Oct. 22, 1999

(30) Foreign Application Priority Data

Apr. 30, 1999 (JP) .......................................... 11-123482

(51) Int. Cl.[7] .............................................. G11B 17/04
(52) U.S. Cl. ...................................................... 369/77.2
(58) Field of Search ............................. 369/77.2, 77.1, 369/75.1; 360/99.02, 96.5, 99.06

(56) References Cited

U.S. PATENT DOCUMENTS

| | | | |
|---|---|---|---|
| 4,291,353 A | * 9/1981 | Fletcher et al. | 360/128 |
| 4,481,617 A | * 11/1984 | Mabry | 369/77.2 |
| 4,509,086 A | * 4/1985 | Hickethier et al. | 360/86 |
| 4,839,760 A | * 6/1989 | Yamada et al. | 360/97.01 |
| 5,142,523 A | * 8/1992 | Kamoshita | 369/75.2 |
| 5,675,566 A | * 10/1997 | Kosaka et al. | 369/77.1 |

FOREIGN PATENT DOCUMENTS

JP          719839          4/1995

* cited by examiner

*Primary Examiner*—David Hudspeth
*Assistant Examiner*—Angel Castro
(74) *Attorney, Agent, or Firm*—Greer, Burns & Crain, Ltd.

(57) ABSTRACT

A cartridge holding mechanism for a storage device, including a pair of cartridge pressure springs each extending in a longitudinal direction of a cartridge holder corresponding to a direction of insertion of a cartridge into the storage device. The cartridge pressure springs are pivotably mounted to opposite side portions of the cartridge holder in the vicinity of the opposite sides of the cartridge holder. A pair of projections are formed at opposite end portions of each cartridge pressure spring to make pressure contact with the cartridge inserted in the storage device. Each cartridge pressure spring has a weight balance such that a front portion thereof corresponding to a front end of the storage device from which the cartridge is inserted is lighter in weight than a rear portion thereof with respect to the corresponding pivotal axis.

12 Claims, 10 Drawing Sheets

OPTICAL STORAGE DEVICE INCLUDING A STABLE CARTRIDGE HOLDING MECHANISM

BACKGROUND OF THE INVENTION

1. Field of the Invention

The present invention relates generally to an optical storage device, and more particularly to a cartridge holding mechanism for an optical storage device.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data (information) from/to the optical disk by means of an optical pickup (optical head).

A recent optical disk drive intended to realize size reduction is composed of a fixed optical assembly including a laser diode module, a polarization beam splitter for reflecting and transmitting a laser beam, and a photodetector for receiving reflected light from an optical disk, and a movable optical assembly including a carriage and an optical head having an objective lens and a beam raising mirror mounted on the carriage. The carriage is movable in the radial direction of the optical disk along a pair of rails by means of a voice coil motor.

A write-power laser beam emitted from the laser diode module of the fixed optical assembly is first collimated by a collimator lens, next transmitted by the polarization beam splitter, next reflected by the beam raising mirror of the optical head, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the polarization beam splitter, and finally detected by the photodetector, thereby converting the detected optical signal into an electrical signal.

In general, a cartridge holder is used to hold the optical disk cartridge in the optical disk drive. Further, a spring mechanism as an independent component for firmly holding the cartridge is mounted on the cartridge holder, so as to prevent the play (rattling) of the cartridge in the cartridge holder due to vibration or shock. However, the optical disk is a removable medium, and there are slight variations in size of the cartridge, differences in material of the cartridge, and differences in surface finished condition of the cartridge due to differences in cartridge maker. According to these differences and differences in use frequency (the number of insertions and ejections) of the cartridge, there occur variations in frictional force generated between the cartridge surface and the cartridge holder or another sliding member such as a drive base in the optical disk drive. Accordingly, even in the same optical disk drive, the amount of ejection of the cartridge tends to vary because of such variations in frictional force.

To suppress such variations in the amount of ejection of the cartridge, the conventional cartridge holding mechanism is provided with means for minimizing a change in elastic force of the spring mechanism for holding the cartridge, or provided with a hook mechanism or brake mechanism for stopping or braking the cartridge during ejection. However, such a conventional cartridge holding mechanism employing a spring mechanism as an independent component has a problem of cost increase due to an increase in parts count, an increase in man-hour for parts mounting, and an increase in man-hour for parts managing, for example.

SUMMARY OF THE INVENTION

It is therefore an object of the present invention to provide a cartridge holding mechanism for an optical storage device which can stably hold a cartridge in the device and can obtain a stable frictional force in ejecting the cartridge out of the device.

In accordance with an aspect of the present invention, there is provided an optical storage device capable of accepting a cartridge comprising a cartridge case and an optical recording medium accommodated in said cartridge case, and reading information recorded on said optical recording medium, comprising a base; a light source mounted on said base; an optical head having an objective lens for focusing light from said light source onto said optical recording medium; a photodetector mounted on said base for detecting a regenerative signal from reflected light from said optical recording medium; a cartridge holder having a main surface for holding said cartridge inserted in said optical storage device; a first cartridge pressure spring mounted to a side portion of said cartridge holder in the vicinity of a first side of said cartridge holder so as to be pivotable about a first pivotal axis substantially parallel to said main surface, said first cartridge pressure spring extending substantially in a longitudinal direction of said cartridge holder corresponding to a direction of insertion of said cartridge into said optical storage device; a second cartridge pressure spring mounted to another side portion of said cartridge holder in the vicinity of a second side of said cartridge holder opposite to said first side so as to be pivotable about a second pivotal axis substantially parallel to said main surface, said second cartridge pressure spring extending substantially in said longitudinal direction of said cartridge holder; a pair of first projections formed at opposite end portions of said first cartridge pressure spring for making pressure contact with said cartridge; and a pair of second projections formed at opposite end portions of said second cartridge pressure spring for making pressure contact with said cartridge.

Preferably, said first cartridge pressure spring has a weight balance such that a front portion of said first cartridge pressure spring corresponding to a front end of said optical storage device from which said cartridge is inserted is lighter in weight than a rear portion of said first cartridge pressure spring with respect to said first pivotal axis; and said second cartridge pressure spring has a weight balance such that a front portion of said second cartridge pressure spring corresponding to said front end of said optical storage device is lighter in weight than a rear portion of said second cartridge pressure spring with respect to said second pivotal axis. The first cartridge pressure spring has a pair of first raised portions having aligned holes, and said second cartridge pressure spring has a pair of second raised portions having aligned holes. The cartridge holder has a pair of third raised portions having aligned holes, and a pair of fourth raised portions having aligned holes.

The optical storage device further comprises a first pin inserted through said aligned holes of said first raised portions and said aligned holes of said third raised portions for pivotably supporting said first cartridge pressure spring to said cartridge holder, and a second pin inserted through said aligned holes of said second raised portions and said aligned holes of said fourth raised portions for pivotably supporting said second cartridge pressure spring to said cartridge holder. The first and second cartridge pressure springs are formed of metal such as stainless steel and phosphor bronze. The first and second cartridge pressure springs may be formed of molded resin. In this case, the first pin is integral with the first cartridge pressure spring, and the second pin is integral with the second cartridge pressure spring.

In accordance with another aspect of the present invention, there is provided a cartridge holding mechanism for a storage device, comprising a base; a cartridge holder having a main surface for holding a recording medium cartridge inserted in said storage device, in cooperation with said base; a first cartridge pressure spring mounted to a side portion of said cartridge holder in the vicinity of a first side of said cartridge holder so as to be pivotable about a first pivotal axis substantially parallel to said main surface, said first cartridge pressure spring extending substantially in a longitudinal direction of said cartridge holder corresponding to a direction of insertion of said cartridge into said storage device; a second cartridge pressure spring mounted to another side portion of said cartridge holder in the vicinity of a second side of said cartridge holder opposite to said first side so as to be pivotable about a second pivotal axis substantially parallel to said main surface, said second cartridge pressure spring extending substantially in said longitudinal direction of said cartridge holder; a pair of first projections formed at opposite end portions of said first cartridge pressure spring for making pressure contact with said cartridge; and a pair of second projections formed at opposite end portions of said second cartridge pressure spring for making pressure contact with said cartridge.

Preferably, said first cartridge pressure spring has a weight balance such that a front portion of said first cartridge pressure spring corresponding to a front end of said storage device from which said cartridge is inserted is lighter in weight than a rear portion of said first cartridge pressure spring with respect to said first pivotal axis; and said second cartridge pressure spring has a weight balance such that a front portion of said second cartridge pressure spring corresponding to said front end of said storage device is lighter in weight than a rear portion of said second cartridge pressure spring with respect to said second pivotal axis.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
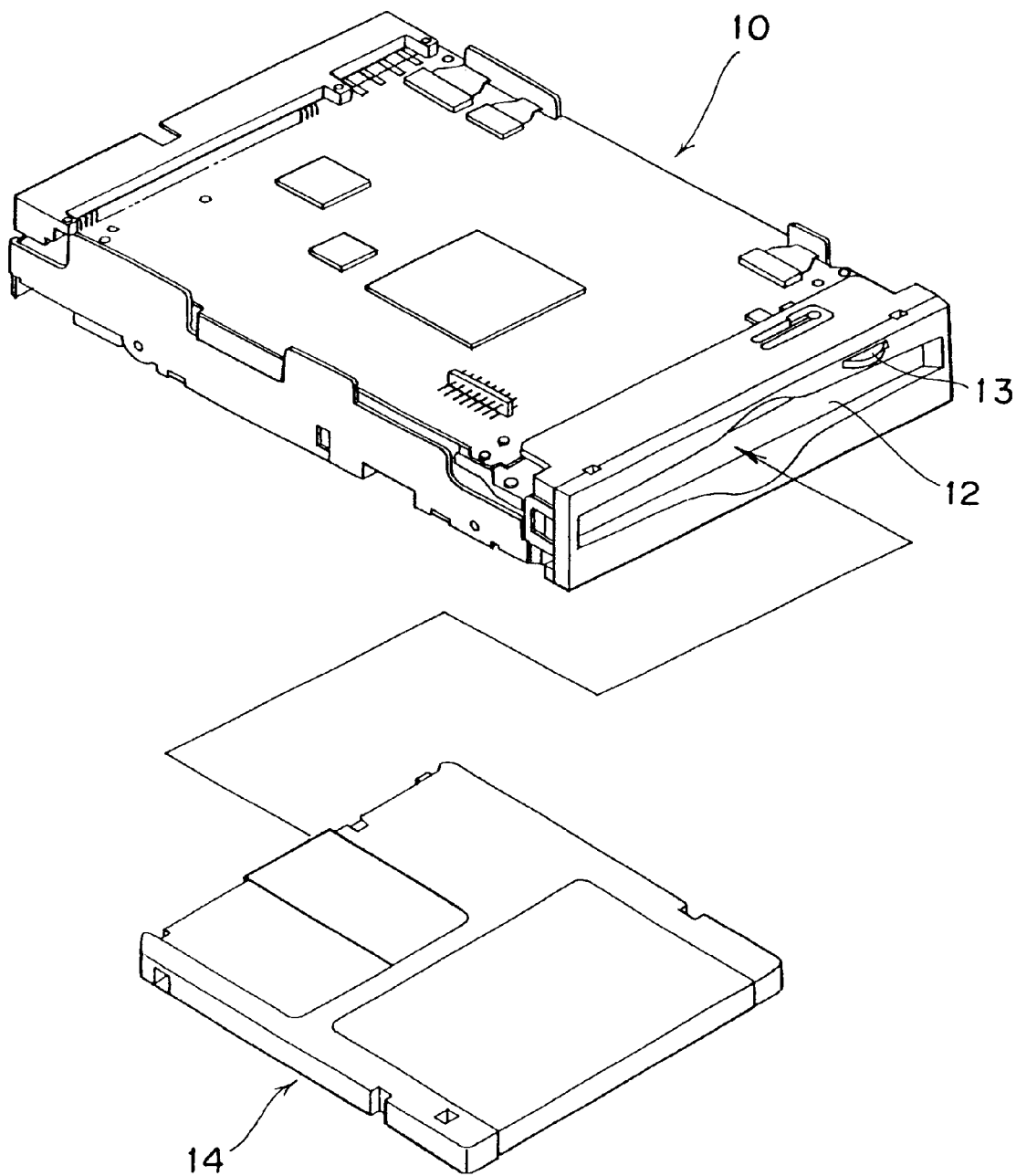
FIG. 1 is an upper perspective view of a magneto-optical disk drive including a cartridge holding mechanism according to the present invention.
Figure 2:
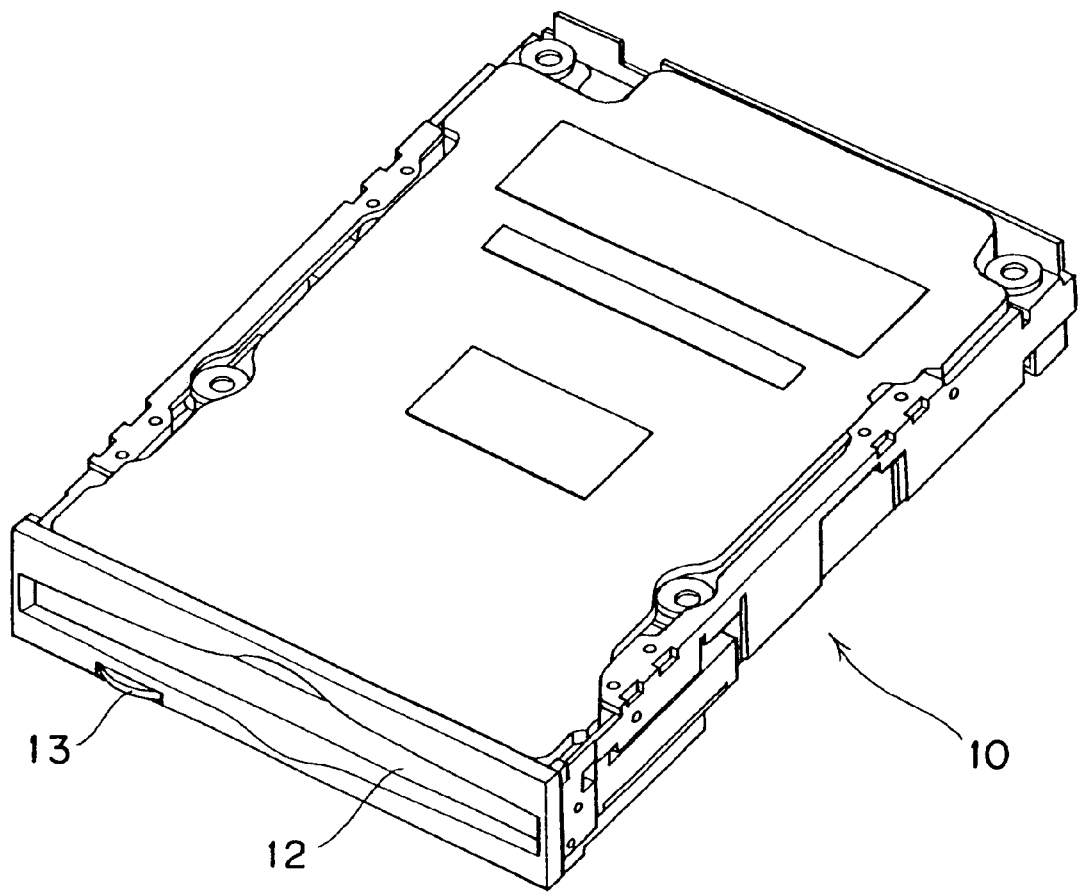
FIG. 2 is a lower perspective view of the magneto-optical disk drive.

Referring to FIG. 1, there is shown a perspective view of a magneto-optical disk drive 10 to which the present invention is applied, as viewed from the upper side. FIG. 2 is a perspective view of the magneto-optical disk drive 10 as viewed from the lower side. The magneto-optical disk drive 10 accepts a magneto-optical disk cartridge 14 having a cartridge case and a magneto-optical disk (both will be hereinafter described) accommodated in the cartridge case, and performs reading/writing of data from/to the magneto-optical disk in the magneto-optical disk cartridge 14. Reference numeral 13 denotes an eject button for ejecting the magneto-optical disk cartridge 14 out of the magneto-optical disk drive 10.

As will be hereinafter described in detail, the magneto-optical disk drive 10 includes a load/eject mechanism for the magneto-optical disk cartridge 14, a spindle motor for rotating the magneto-optical disk, a bias magnetic field generating mechanism, a positioner, a fixed optical assembly, and a movable optical assembly. The magneto-optical disk drive 10 further has an insert opening 12 for accepting the magneto-optical disk cartridge 14.

Figure 3A:
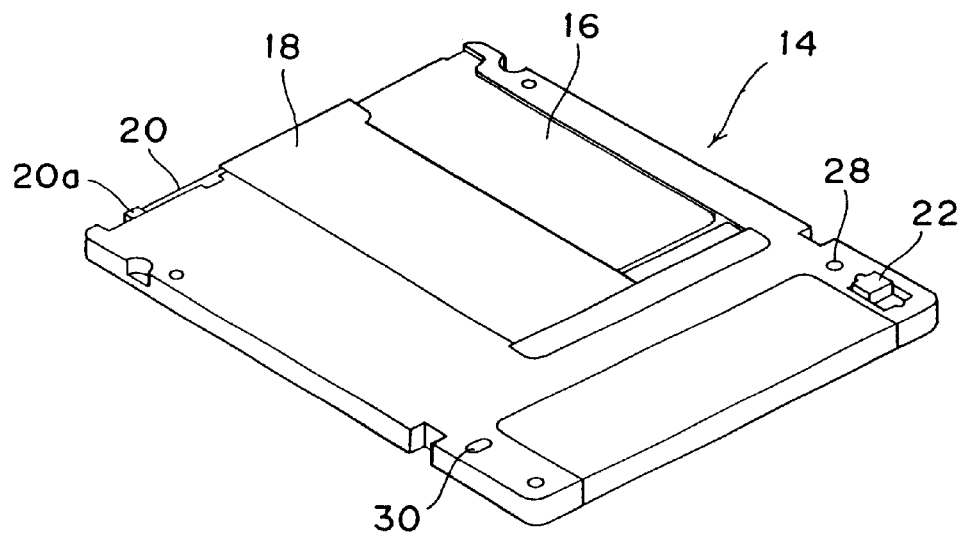
FIG. 3A is a perspective view of a magneto-optical disk cartridge in a shutter closed condition.
Figure 3B:
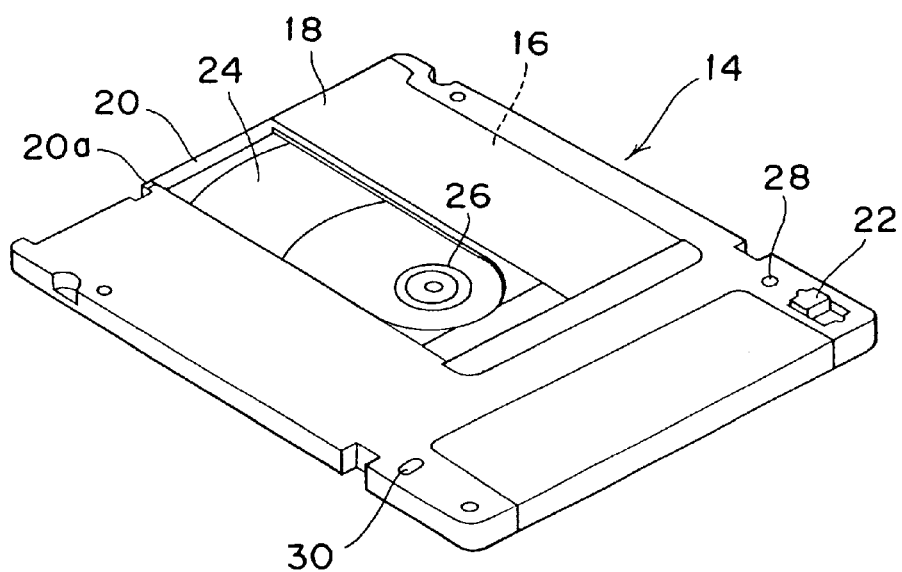
FIG. 3B is a perspective view of the magneto-optical disk cartridge in a shutter open condition.

FIGS. 3A and 3B are perspective views of the magneto-optical disk cartridge 14 in its different conditions, as viewed from the lower side. It should be noted that FIG. 1 shows the upper side of the magneto-optical disk cartridge 14. As shown in FIG. 3A, the magneto-optical disk cartridge 14 has a cartridge case 16. The cartridge case 16 is provided with a slidable shutter 18. A shutter opening arm 20 is mounted at a front end portion of the shutter 18. A write protector 22 for prohibiting writing onto a magneto-optical disk is provided at a rear end portion of the cartridge case 16.

When an end portion 20a of the shutter opening arm 20 is pushed by a slider to be hereinafter described, the shutter 18 is slid on the cartridge case 16. FIG. 3B shows a condition where the shutter 18 is fully open. As shown in FIG. 3B, a magneto-optical disk 24 as a data recording medium is rotatably accommodated in the cartridge case 16. The magneto-optical disk 24 has a central hub 26 adapted to be chucked for rotation by a spindle motor to be hereinafter described.

Two reference holes 28 and 30 for positioning the magneto-optical disk cartridge 14 in the magneto-optical disk drive 10 are formed near the opposite side edges at the rear end portion of the cartridge case 16. The reference hole 28 is a round hole, and the reference hole 30 is an elongated hole.

Figure 4:
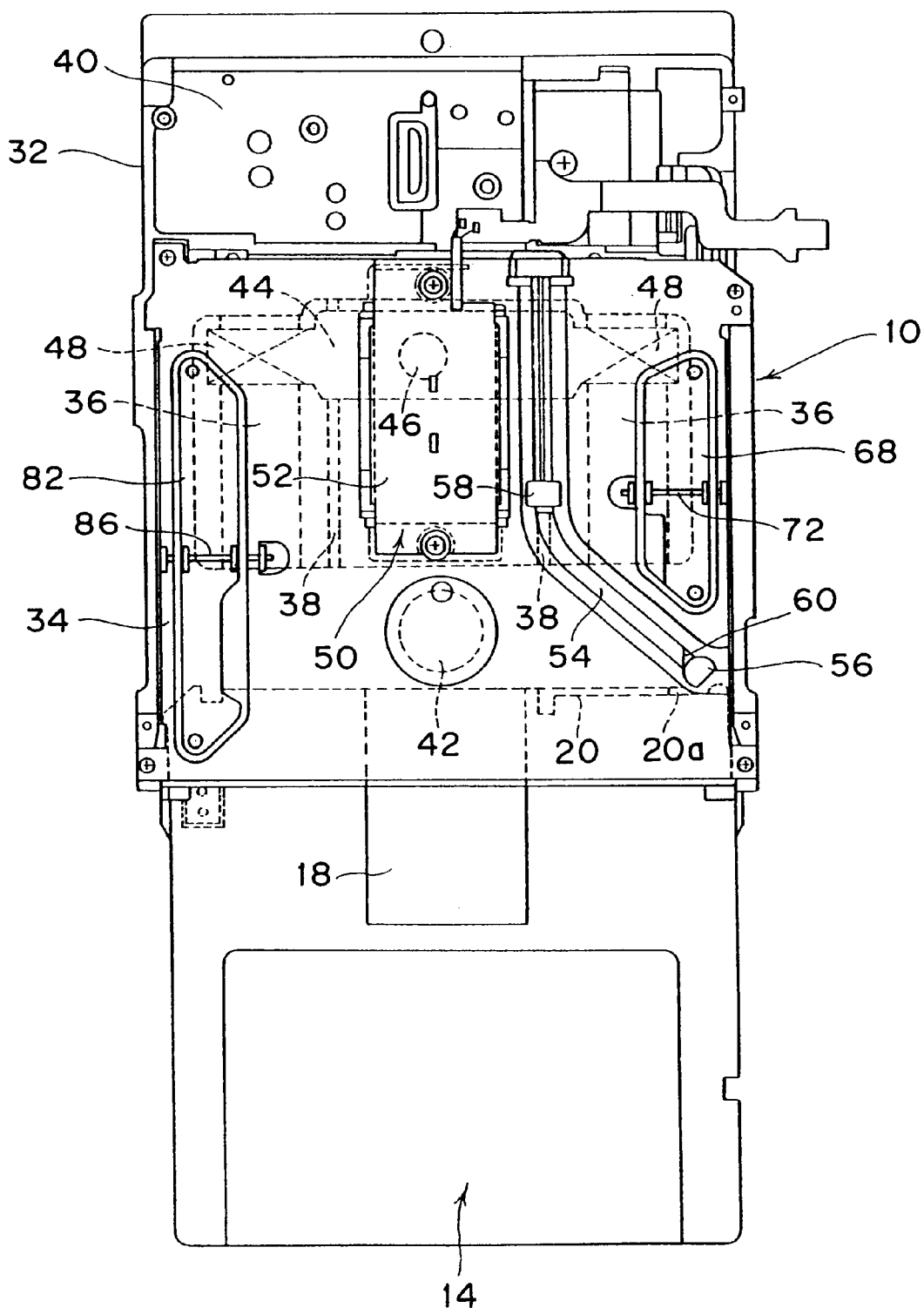
FIG. 4 is a top plan view of the magneto-optical disk drive in the condition where the magneto-optical disk cartridge is slightly inserted in the magneto-optical disk drive.

FIG. 4 is a plan view showing a condition where the magneto-optical disk cartridge 14 is slightly inserted in the magneto-optical disk drive 10 from the insert opening 12. Reference numeral 32 denotes a drive base of the magneto-optical disk drive 10. A cartridge holder 34 for holding the magneto-optical disk cartridge 14 inserted into the magneto-optical disk drive 10 is mounted on the drive base 32.

Further mounted on the drive base 32 are a pair of magnetic circuits 36, a pair of guide rails 38, a fixed optical assembly 40 having a laser diode and a photodetector, and a spindle motor 42. Reference numeral 44 denotes a carriage for carrying an optical head 46 having an objective lens. The carriage 44 is provided with a pair of coils 48 at opposite positions respectively corresponding to the pair of magnetic circuits 36. The magnetic circuits 36 and the coils 48 constitute a voice coil motor (VCM). When a current is passed through the coils 48, the carriage 44 is guided by the pair of guide rails 38 to move in the radial direction of the magneto-optical disk 24.

Reference numeral 50 denotes a bias magnetic field generating mechanism including a back yoke 52, a center yoke (not shown), and a coil (not shown). The bias magnetic field generating mechanism 50 is mounted on the cartridge holder 34 so as to cover a range of movement of the optical head 46. The cartridge holder 34 is formed with a guide groove 54. The guide groove 54 is composed of a first portion obliquely extending from one end of the insert opening 12 laterally inward of the cartridge holder 34 and a second portion extending from an inward end of the first portion to the rear end of the cartridge holder 34 in parallel to the longitudinal direction of the magneto-optical disk drive 10. A first slider 56 and a second slider 58 are slidably engaged with the guide groove 54. The second slider 58 is connected to the first slider 56 by a cartridge ejecting spring 60. Although not shown, a similar cartridge ejecting spring is provided between the second slider 58 and the cartridge holder 34. When the first slider 56 is moved, the second slider 58 is moved through the spring 60 to the rear end of the cartridge holder 34.

When the magneto-optical disk cartridge 14 is inserted from the insert opening 12 into the magneto-optical disk drive 10, the first slider 56 comes into abutment against the end portion 20a of the shutter opening arm 20 mounted to the shutter 18 of the magneto-optical disk cartridge 14. During insertion of the magneto-optical disk cartridge 14 into the magneto-optical disk drive 10, the first slider 56 is moved along the guide groove 54 to push the shutter opening arm 20, thereby opening the shutter 18.

Figure 5:
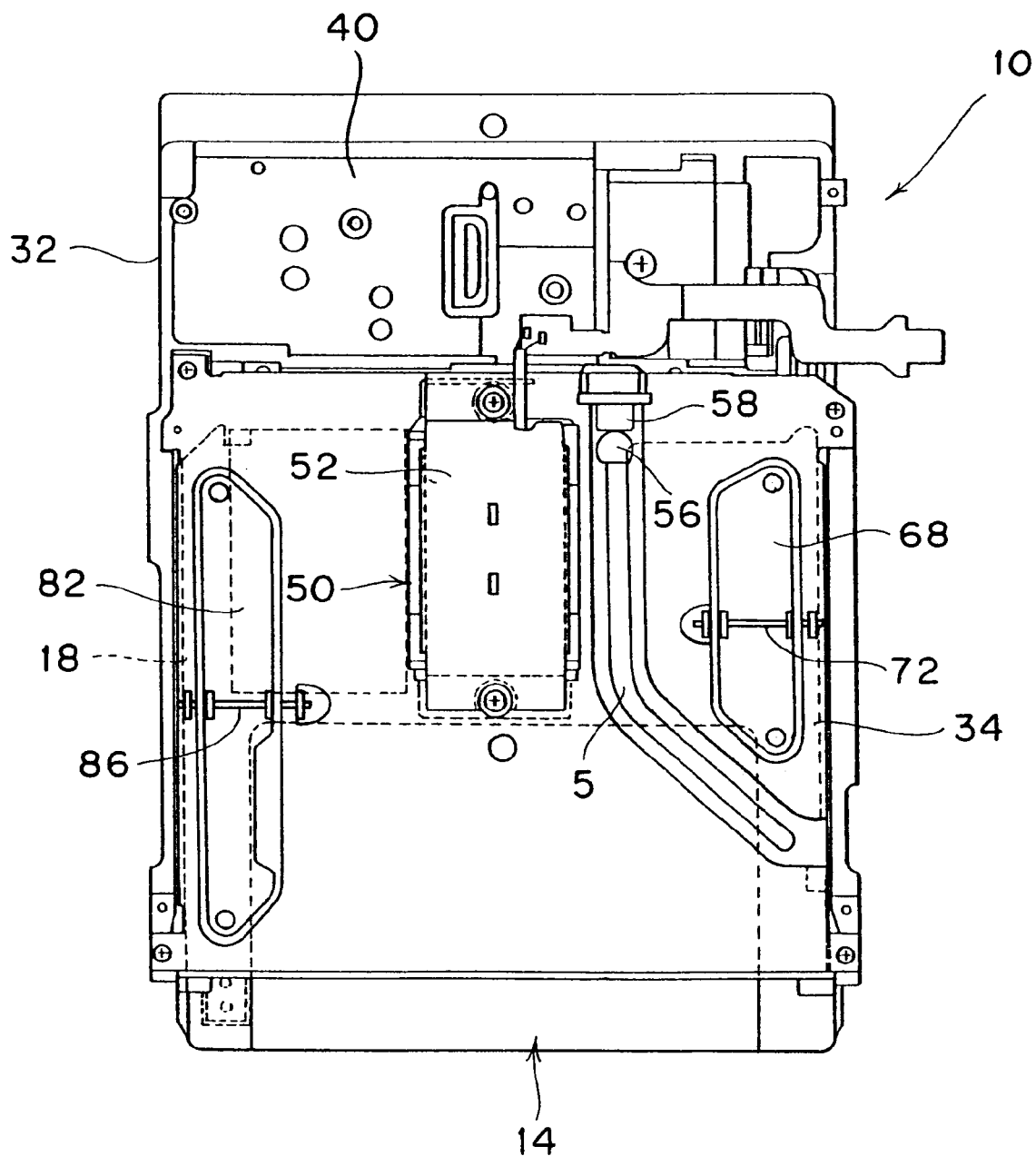
FIG. 5 is a top plan view of the magneto-optical disk drive in the condition where the magneto-optical disk cartridge is fully inserted in the magneto-optical disk drive.

FIG. 5 shows a condition where the magneto-optical disk cartridge 14 is fully inserted into the magneto-optical disk drive 10 from the condition shown in FIG. 4, and the shutter 18 is fully open. In this manner, by inserting the magneto-optical disk cartridge 14 into the magneto-optical disk drive 10, the shutter 18 of the magneto-optical disk cartridge 14 is automatically opened by the first slider 56.

Figure 6:
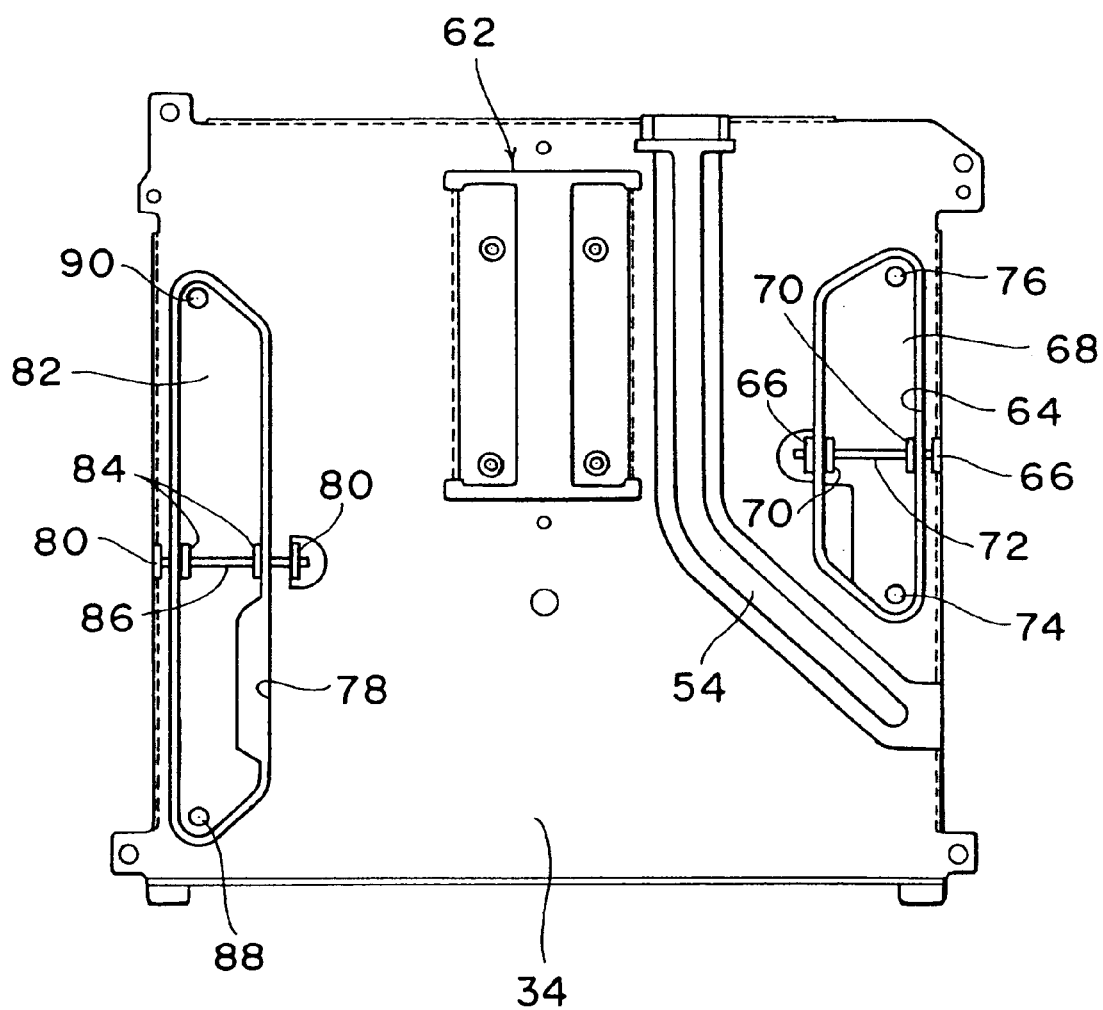
FIG. 6 is a top plan view of a cartridge holder according to a preferred embodiment of the present invention.
Figure 7A:
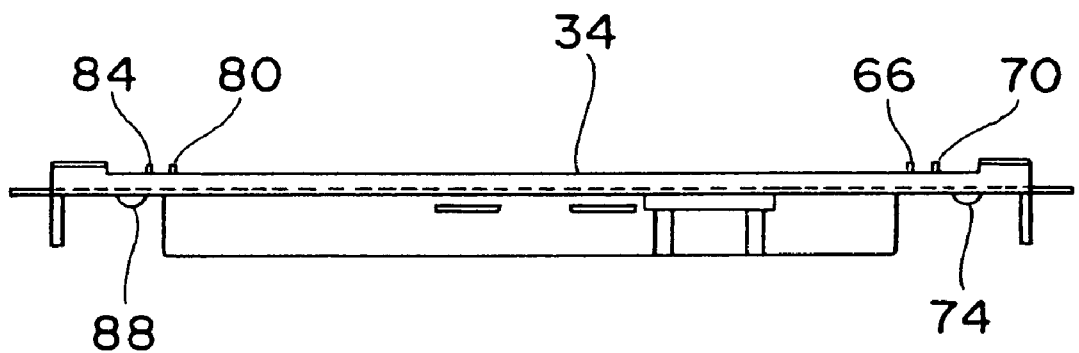
FIG. 7A is a front elevation of the cartridge holder.
Figure 7B:
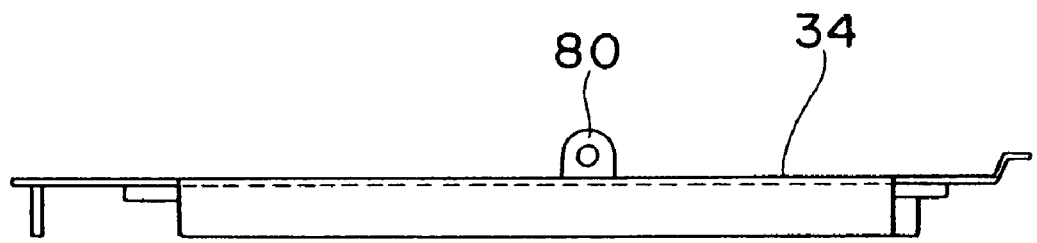
FIG. 7B is a left side view of the cartridge holder.
Figure 8:
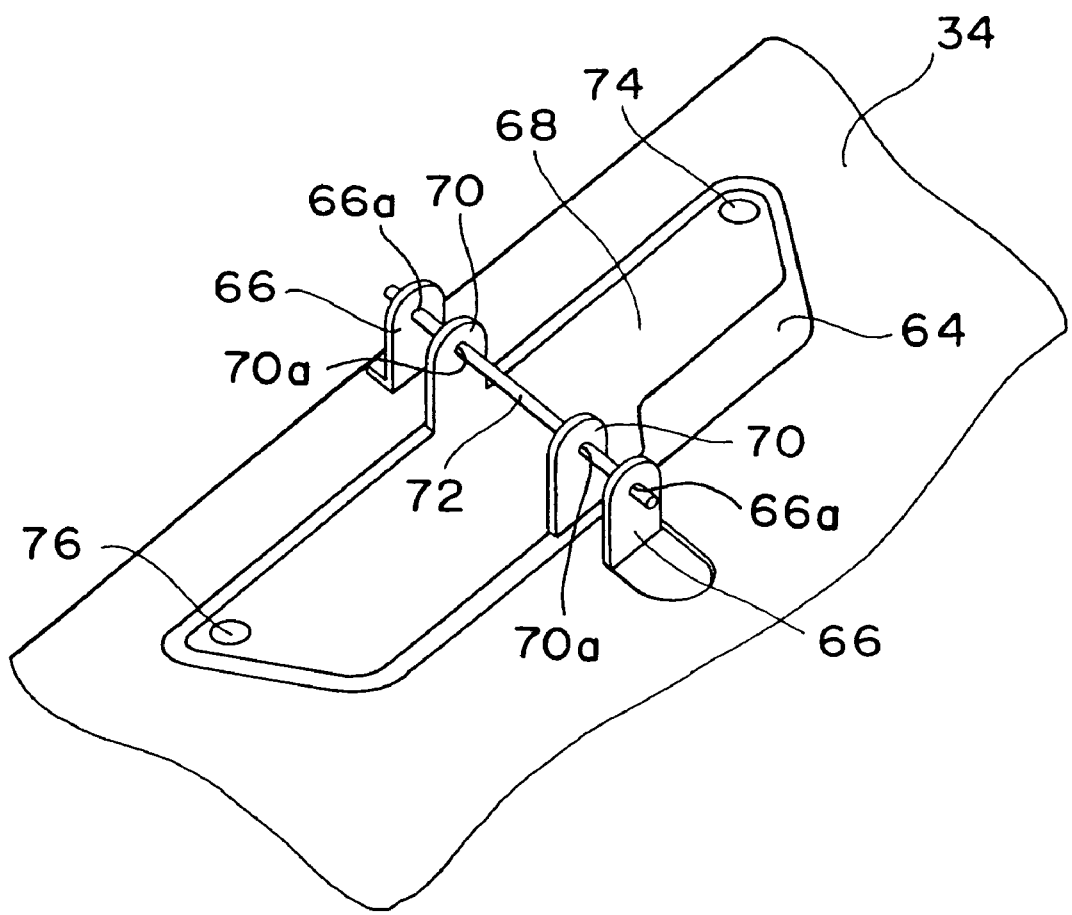
FIG. 8 is a perspective view showing a cartridge pressure spring.

Referring to FIG. 6, there is shown a top plan view of the cartridge holder 34. An opening 64 is formed at one side portion of the cartridge holder 34 in the vicinity of the right side of the cartridge holder 34 so as to extend in the longitudinal direction of the cartridge holder 34 corresponding to the direction of insertion of the magneto-optical disk cartridge 14. As best shown in FIG. 8, the cartridge holder 34 has a pair of raised portions 66 formed by cutting and bending the cartridge holder 34. The raised portions 66 are opposed to each other with the opening 64 interposed therebetween, and have aligned holes 66a. Reference numeral 68 denotes a cartridge pressure spring extending in the longitudinal direction of the cartridge holder 34. The cartridge pressure spring 68 has a pair of raised portions 70 formed by bending the spring 68. The raised portions 70 are opposed to each other, and have aligned holes 70a. The cartridge pressure spring 68 is fitted in the opening 64. In this condition, the holes 70a of the raised portions 70 of the cartridge pressure spring 68 are aligned with the holes 66a of the raised portions 66 of the cartridge holder 34. A pin 72 is inserted through the these aligned holes 66a and 70a of the raised portions 66 and 70, thereby pivotably supporting the cartridge pressure spring 68 to the cartridge holder 34. The pin 72 may be fixed to the raised portions 66 of the cartridge holder 34. Alternatively, the pin 72 may be fixed to the raised portions 70 of the cartridge pressure spring 68.

A pair of projections 74 and 76 for making pressure contact with the cartridge are formed at opposite end portions of the cartridge pressure spring 68 so as to project to the lower side of the cartridge holder 34. Each of the projections 74 and 76 has a height of about 1.2 to 1.5 mm. Preferably, the cartridge pressure spring 68 has a weight balance such that a front portion of the cartridge pressure spring 68 where the projection 74 is formed is lighter in weight than a rear portion of the cartridge pressure spring 68 where the projection 76 is formed, with respect to the pivotal axis of the spring 68 (the axis of the pin 72). Accordingly, in the condition where the cartridge is not inserted in the cartridge holder 34, the cartridge pressure spring 68 is inclined in such a manner that its front portion is raised from the upper surface of the cartridge holder 34.

However, the above-mentioned weight balance of the cartridge pressure spring 68 is not essential in the present invention. In ejecting the cartridge, the projection 76 abutting under pressure against the cartridge is first separated from the cartridge. At this time, the spring force of the cartridge pressure spring 68 applied to the cartridge is removed. Since the cartridge pressure spring 68 is sufficiently light in weight, the sliding friction between the cartridge pressure spring 68 and the cartridge during further ejection of the cartridge can be greatly reduced, thereby obtaining a stable amount of ejection of the cartridge.

The cartridge pressure spring 68 is formed preferably of stainless steel. Any other metals such as phosphor bronze may also be adopted as the cartridge pressure spring 68. Alternatively, the cartridge pressure spring 68 may be formed of molded resin. In this case, the cartridge pressure spring 68 is integrally formed with the raised portions 70 and the projections 74 and 76 by resin molding.

Similarly, an opening 78 larger than the opening 64 is formed at the other side portion of the cartridge holder 34 in the vicinity of the left side of the cartridge holder 34 so as to extend in the longitudinal direction of the cartridge holder 34 corresponding to the direction of insertion of the magneto-optical disk cartridge 14. The cartridge holder 34 has a pair of raised portions 80 formed by cutting and bending the cartridge holder 34. The raised portions 80 are opposed to each other with the opening 78 interposed therebetween, and have aligned holes. Reference numeral 82 denotes a cartridge pressure spring extending in the longitudinal direction of the cartridge holder 34. The cartridge pressure spring 82 has a pair of raised portions 84 formed by bending the spring 82. The raised portions 84 are opposed to each other, and have aligned holes. The cartridge pressure spring 82 is fitted in the opening 78. In this condition, the holes of the raised portions 84 of the cartridge pressure spring 82 are aligned with the holes of the raised portions 80 of the cartridge holder 34. A pin 86 is inserted through the these aligned holes of the raised portions 80 and 84, thereby pivotably supporting the cartridge pressure spring 82 to the cartridge holder 34. The pin 86 may be fixed to the raised portions 80 of the cartridge holder 34. Alternatively, the pin 86 may be fixed to the raised portions 84 of the cartridge pressure spring 82.

A pair of projections 88 and 90 for making pressure contact with the cartridge are formed at opposite end portions of the cartridge pressure spring 82 so as to project to the lower side of the cartridge holder 34. Each of the projections 88 and 90 has a height of about 1.2 to 1.5 mm. Preferably, the cartridge pressure spring 82 has a weight balance such that a front portion of the cartridge pressure spring 82 where the projection 88 is formed is lighter in weight than a rear portion of the cartridge pressure spring 82 where the projection 90 is formed, with respect to the pivotal axis of the spring 82 (the axis of the pin 86). Accordingly, in the condition where the cartridge is not inserted in the cartridge holder 34, the cartridge pressure spring 82 is inclined in such a manner that its front portion is raised from the upper surface of the cartridge holder 34.

However, as in the cartridge pressure spring 68, the above-mentioned weight balance of the cartridge pressure spring 82 is not essential in the present invention. Reference numeral 62 denotes a bias magnetic field generating mechanism mounting portion where the bias magnetic field generating mechanism 50 including the back yoke 52, the center yoke, and the coil is mounted.

FIG. 5 shows a condition where the cartridge 14 is fully in the magneto-optical disk drive 10. In this condition, the spindle motor 42 is raised to chuck the hub 26 of the magneto-optical disk 24. The projections 74 and 76 of the cartridge pressure spring 68 and the projections 88 and 90 of the cartridge pressure 82 come to pressure contact with the cartridge 14, thereby pressing the cartridge 14 against the base 32 of the magneto-optical disk drive 10. In this condition, the spindle motor 42 is driven to rotate the magneto-optical disk 24 and perform reading/writing of data from/to the magneto-optical disk 24.

In ejecting the cartridge 14 out of the magneto-optical disk drive 10, the eject button 13 is depressed by an operator. As a result, a lock mechanism (not shown) is released, and the cartridge 14 is ejected by the biasing force of the cartridge ejecting spring 60.

Figure 9A:
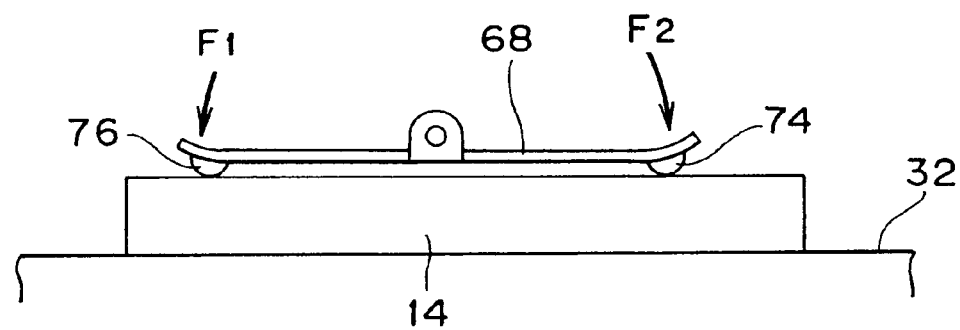
FIG. 9A is a side view illustrating the operation of the cartridge pressure spring in a cartridge loaded condition.

The operation of this preferred embodiment in ejecting the cartridge 14 out of the magneto-optical disk drive 10 will now be described with reference to FIGS. 9A and 9B. FIG. 9A shows a condition where the cartridge 14 loaded into the magneto-optical disk drive 10 is pressed on the base 32 by the projections 74 and 76 of the cartridge pressure spring 68. Although not shown, the cartridge 14 is pressed on the base 32 also by the projections 88 and 90 of the cartridge pressure spring 82. In this condition, the cartridge pressure springs 68 and 82 are elastically deformed to apply to the cartridge 14 given spring forces enough to prevent play of the cartridge 14 in the cartridge holder 34 due to vibration and shock as defined by the specifications of the magneto-optical disk drive 10.

Figure 9B:
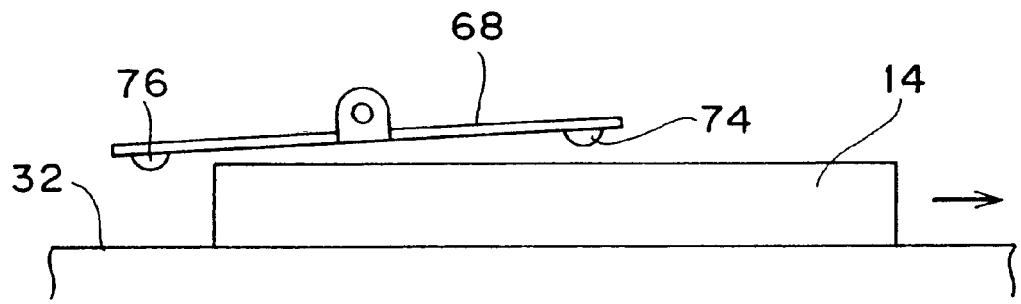
FIG. 9B is a side view illustrating the operation of the cartridge pressure spring in ejecting the cartridge.

FIG. 9B shows a condition where the cartridge 14 starts to be ejected in the direction shown by an arrow 75 and the projections 76 formed at the rear portion of the cartridge pressure spring 68 is separated from the cartridge 14. In this condition, the front portion of the cartridge pressure spring 68 is also separated from the cartridge 14 because the front portion is lighter in weight than the rear portion with respect to the pivotal axis of the spring 68 according to this preferred embodiment. Accordingly, the spring force of the cartridge pressure spring 68 is completely removed in the condition shown in FIG. 9B.

As apparent from FIG. 6, the projection 76 of the cartridge pressure spring 68 and the projection 90 of the cartridge pressure spring 82 are substantially aligned with each other in the lateral direction of the cartridge holder 34. Accordingly, in ejecting the cartridge 14, the projection 76 of the cartridge pressure spring 68 and the projection 90 of the cartridge pressure spring 82 are separated from the cartridge 14 at substantially the same time. As a result, when the cartridge 14 is ejected to a given position, the spring forces of the cartridge pressure springs 68 and 82 are completely removed.

In the conventional cartridge holding mechanism, a spring force continues to be applied to a cartridge until the cartridge is fully ejected from an optical disk drive. To the contrary, according to this preferred embodiment, at the time the cartridge 14 starts to be ejected, the spring forces of the cartridge pressure springs 68 and 82 are removed from the cartridge 14, so that a distance where a frictional force is generated between the cartridge and each cartridge pressure spring can be reduced. As a result, variations in the frictional force can be suppressed to thereby improve the stability of ejection of the cartridge.

Figure 10A:
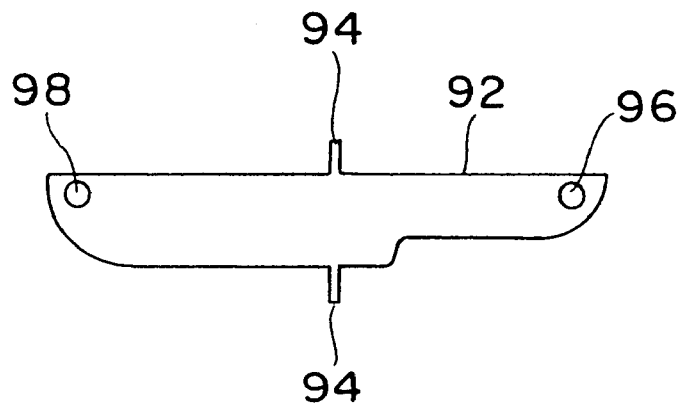
FIGS. 10A and 10B are plan views showing other preferred embodiments of the cartridge pressure spring.
Figure 10B:
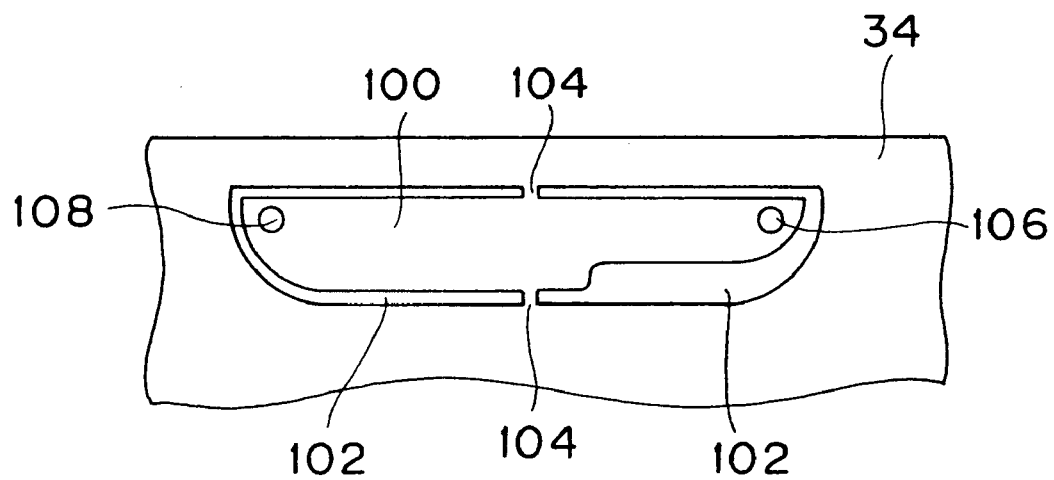

FIGS. 10A and 10B show other preferred embodiments of each cartridge pressure spring according to the present invention. In the preferred embodiment shown in FIG. 10A, a cartridge pressure spring 92 is integrally formed with a pair of pins 94 from a metal sheet. A pair of projections 96 and 98 are formed at opposite end portions of the cartridge pressure spring 92. Preferably, the thickness t of the cartridge pressure spring 92 is set to 0.5 mm or less, and the width w1 of each pin 94 is set so as to satisfy the relation of $w1 \leq 3t$. The cartridge pressure spring 92 is rotatable about the axis of each pin 94. In modification, the pins 94 may be covered with resin by out-sert molding to thereby facilitate the rotation of the cartridge pressure spring 92 about the axis of each pin 94.

In the preferred embodiment shown in FIG. 10B, the cartridge holder 34 is integrally formed with a cartridge pressure spring 100. The cartridge pressure spring 100 is formed by cutting a slit 102 in the cartridge holder 34 with a pair of bridges 104 left to support the spring 100. A pair of projections 106 and 108 are formed at opposite end portions of the cartridge pressure spring 100. Preferably, the thickness t of the cartridge pressure spring 100 is set to 0.5 mm or less, and the width w2 of each bridge 104 is set so as to satisfy the relation of $w2 \leq 3t$. Furthermore, the cartridge pressure spring 100 is slightly twisted in advance about the axis of each bridge 104 in such a manner that a front portion of the cartridge pressure spring 100 where the projection 106 is formed is raised from the upper surface of the cartridge holder 34.

With this structure, the cartridge loaded in the cartridge holder 34 can be pressed by the cartridge pressure spring 100 against the drive base 32, thus stably holding the cartridge. When the cartridge is ejected to a given position, the projection 108 is separated from the cartridge, so that the spring force of the cartridge pressure spring 100 applied to the cartridge is completely removed. Accordingly, variations in frictional force in ejecting the cartridge can be suppressed as in the previous preferred embodiment, thereby improving the stability of ejection of the cartridge.

According to the present invention as described above, a stable desired frictional force can be obtained in ejecting the cartridge, thereby improving the stability of ejection of the cartridge. Further, it is possible to provide an inexpensive cartridge holding mechanism with a reduced number of parts.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical storage device capable of accepting a cartridge comprising a cartridge case and an optical recording medium accommodated in said cartridge case, and reading information recorded on said optical recording medium, comprising:

a light source;

an optical head having an objective lens for focusing light from said light source onto said optical recording medium;

a photodetector for detecting a reproducing signal from reflected light from said optical recording medium;

a cartridge holder having a main surface for holding said cartridge inserted in said optical storage device;

a first cartridge pressure spring mounted to a side portion of said cartridge holder in the vicinity of a first side of said cartridge holder so as to be pivotable about a first pivotal axis substantially parallel to said main surface, said first cartridge pressure spring extending substantially in a longitudinal direction of said cartridge holder corresponding to a direction of insertion of said cartridge into said optical storage device;

a second cartridge pressure spring mounted to another side portion of said cartridge holder in the vicinity of a second side of said cartridge holder opposite to said first side so as to be pivotable about a second pivotal axis substantially parallel to said main surface, said second cartridge pressure spring extending substantially in said longitudinal direction of said cartridge holder;

a pair of first projections formed at opposite end portions of said first cartridge pressure spring for making pressure contact with said cartridge; and a pair of second projections formed at opposite end portions of said second cartridge pressure spring for making pressure contact with said cartridge.

2. An optical storage device according to claim 1, wherein:

said first cartridge pressure spring has a weight balance such that a front portion of said first cartridge pressure spring corresponding to a front end of said optical storage device from which said cartridge is inserted is lighter in weight than a rear portion of said first cartridge pressure spring with respect to said first pivotal axis; and said second cartridge pressure spring has a weight balance such that a front portion of said second cartridge pressure spring corresponding to said front end of said optical storage device is lighter in weight than a rear portion of said second cartridge pressure spring with respect to said second pivotal axis.

3. An optical storage device according to claim 1, wherein:

said first cartridge pressure spring has a pair of first raised portions having aligned holes, and said second cartridge pressure spring has a pair of second raised portions having aligned holes;

said cartridge holder has a pair of third raised portions having aligned holes, and a pair of fourth raised portions having aligned holes; and said optical storage device further comprises a first pin inserted through said aligned holes of said first raised portions and said aligned holes of said third raised portions for pivotably supporting said first cartridge pressure spring to said cartridge holder, and a second pin inserted through said aligned holes of said second raised portions and said aligned holes of said fourth raised portions for pivotably supporting said second cartridge pressure spring to said cartridge holder.

4. An optical storage device according to claim 3, wherein said first pin is fixed to said third raised portions of said cartridge holder, and said second pin is fixed to said fourth raised portions of said cartridge holder.

5. An optical storage device according to claim 3, wherein said first pin is fixed to said first raised portions of said first cartridge pressure spring, and said second pin is fixed to said second raised portions of said second cartridge pressure spring.

6. An optical storage device according to claim 3, wherein:

said first and second cartridge pressure springs are formed of molded resin;

said first pin being integral with said first cartridge pressure spring;

said second pin being integral with said second cartridge pressure spring.

7. An optical storage device according to claim 4, wherein:

said first and second cartridge pressure springs are formed of sheet metal;

said first pin being integral with said first cartridge pressure spring;

said second pin being integral with said second cartridge pressure spring.

8. An optical storage device according to claim 7, wherein each of said first and second cartridge pressure springs has a thickness of 0.5 mm or less, and each of said first and second pins has a width equal to or less than a value three times said thickness.

9. An optical storage device according to claim 1, wherein:

said cartridge holder is formed of sheet metal;

said cartridge holder is integrally formed with said first cartridge pressure spring by cutting a first slit in said cartridge holder with a pair of first bridges left to support said first cartridge pressure spring; and said cartridge holder is further integrally formed with said second cartridge pressure spring by cutting a second slit in said cartridge holder with a pair of second bridges left to support said second cartridge pressure spring.

10. An optical storage device according to claim 9, wherein each of said first and second cartridge pressure springs has a thickness of 0.5 mm or less, and each of said first and second bridges has a width equal to or less than a value three times said thickness.

11. A cartridge holding mechanism for a storage device, comprising:

a base;

a cartridge holder having a main surface for holding a recording medium cartridge inserted in said storage device, in cooperation with said base;

a first cartridge pressure spring mounted to a side portion of said cartridge holder in the vicinity of a first side of said cartridge holder so as to be pivotable about a first pivotal axis substantially parallel to said main surface, said first cartridge pressure spring extending substantially in a longitudinal direction of said cartridge holder corresponding to a direction of insertion of said cartridge into said storage device;

a second cartridge pressure spring mounted to another side portion of said cartridge holder in the vicinity of a second side of said cartridge holder opposite to said first side so as to be pivotable about a second pivotal axis substantially parallel to said main surface, said second cartridge pressure spring extending substantially in said longitudinal direction of said cartridge holder;

a pair of first projections formed at opposite end portions of said first cartridge pressure spring for making pressure contact with said cartridge; and a pair of second projections formed at opposite end portions of said second cartridge pressure spring for making pressure contact with said cartridge.

12. A cartridge holding mechanism according to claim 11, wherein said first cartridge pressure spring has a weight balance such that a front portion of said first cartridge pressure spring corresponding to a front end of said storage device from which said cartridge is inserted is lighter in weight than a rear portion of said first cartridge pressure spring with respect to said first pivotal axis; and said second cartridge pressure spring has a weight balance such that a front portion of said second cartridge pressure spring corresponding to said front end of said storage device is lighter in weight than a rear portion of said second cartridge pressure spring with respect to said second pivotal axis.

* * * * *

UNITED STATES PATENT AND TRADEMARK OFFICE
CERTIFICATE OF CORRECTION

PATENT NO. : 6,469,973 B1
DATED : October 22, 2002
INVENTOR(S) : Kageyama et al.

It is certified that error appears in the above-identified patent and that said Letters Patent is hereby corrected as shown below:

Column 10,
Line 27, delete "4" insert -- 3 --.

Signed and Sealed this

Twentieth Day of May, 2003

JAMES E. ROGAN
*Director of the United States Patent and Trademark Office*